March 27, 1928.
C. G. STRUBLER
WEIGHING SCALE
Filed Sept. 28, 1925
1,664,003
2 Sheets-Sheet 1
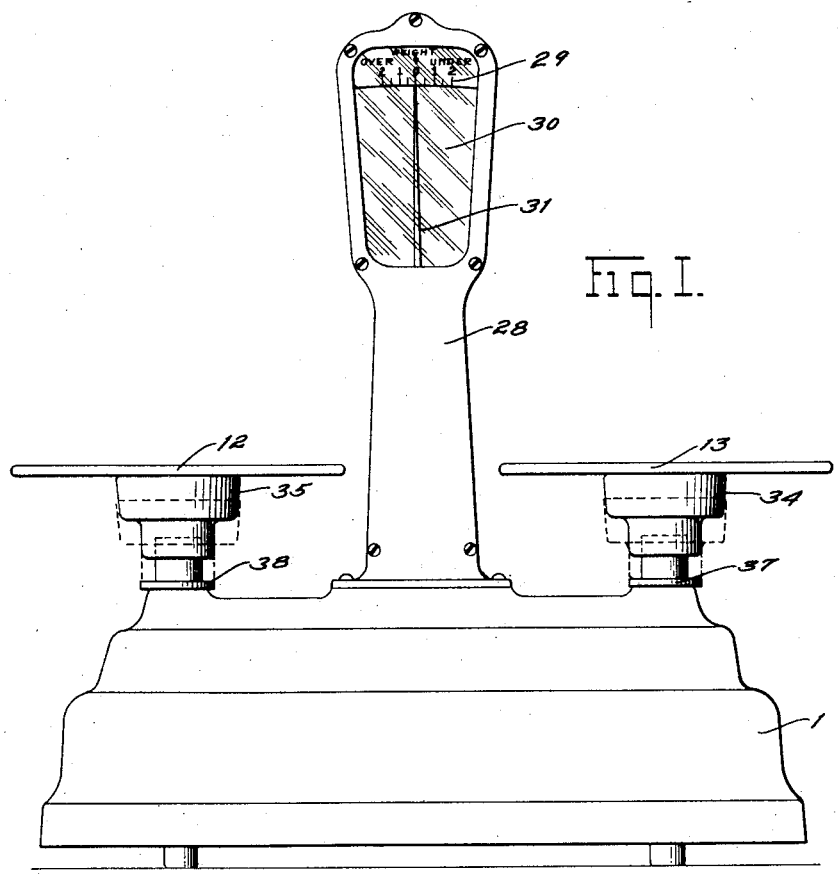
Fig. I.
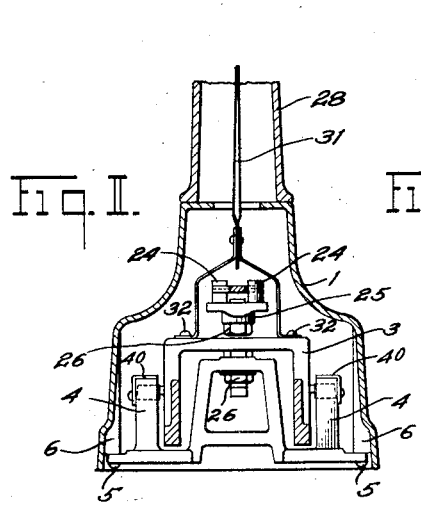
Fig. II.
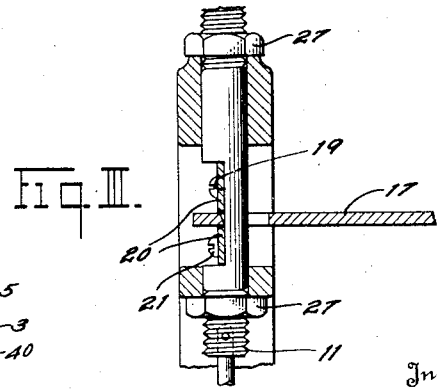
Fig. III.
Inventor
Charles G. Strubler.
By C. M. Marshall
Attorney March 27, 1928.
C. G. STRUBLER
WEIGHING SCALE
Filed Sept. 28, 1925
1,664,003
2 Sheets-Sheet 2
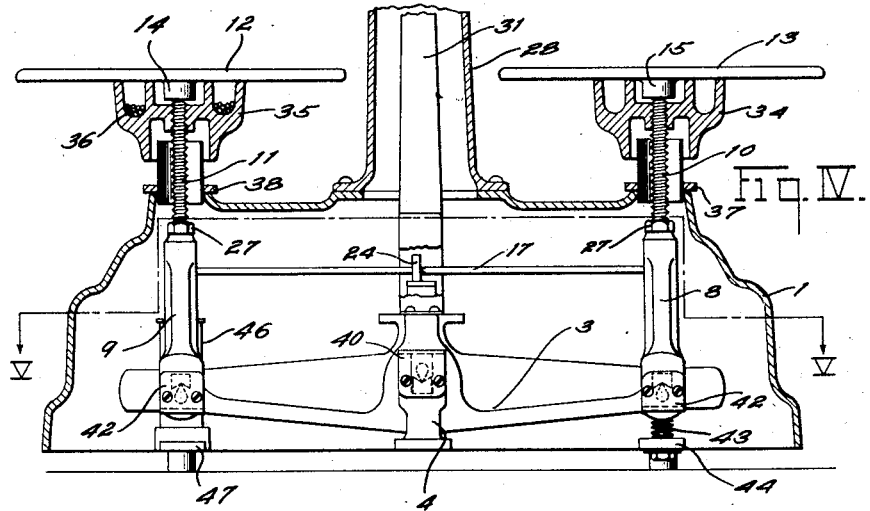
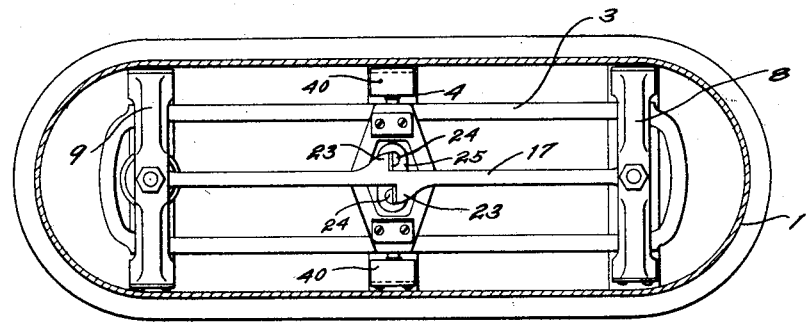
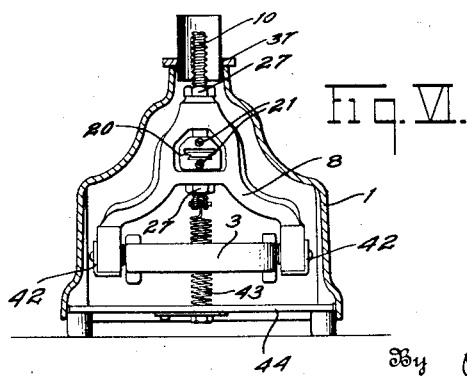
Inventor
Charles G. Strubler
By Geo. M. Marshall
Attorney Patented Mar. 27, 1928.

1,664,003

UNITED STATES PATENT OFFICE.

CHARLES G. STRUBLER, OF CHICAGO, ILLINOIS, ASSIGNOR TO TOLEDO SCALE COMPANY, OF TOLEDO, OHIO, A CORPORATION OF NEW JERSEY.

WEIGHING SCALE.

Application filed September 28, 1925. Serial No. 58,965.

This invention relates to weighing scales and more particularly to scales of the double pan predetermined weight type, and one of the principal objects is the provision of simple and effective means for locking the weighing mechanism against relative movement to prevent damage thereto whenever the scale is moved from place to place.

Another object of this invention is the provision of a scale of the predetermined weight even balance type which is simple in construction and inexpensive to manufacture, but which is sturdy and capable of withstanding the rough handling and service to which scales of this type are usually subjected.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevational view of the scale of my invention;

Figure II is a vertical transverse sectional view through the base of the scale;

Figure III is an enlarged detail sectional view showing one of the check link connections;

Figure IV is a vertical longitudinal sectional view through the scale;

Figure V is a horizontal sectional view taken substantially on the line V—V of Figure IV; and Figure VI is a vertical sectional view through the base showing the load-counterbalancing element.

Referring to the drawings in detail, the weighing scale of my invention comprises a hollow base 1 which is particularly adapted to support and enclose the lever mechanism. The main lever 3 is fulcrumed intermediate its ends upon a supporting bracket 4, the latter being provided with suitable ears which are secured by means of screws 5 to bosses 6 forming integral parts of the base 1. Each end of the lever 3 is provided with pivots which support substantially Y-shaped brackets 8 and 9, the brackets having threaded openings which receive threaded rods 10 and 11. The load and weight receiving platters 12 and 13 are formed with centrally positioned depending bosses 14 and 15 having threaded openings, the platters being threaded upon the upper ends of the rods 10 and 11.

The means to prevent tilting of the platters 12 and 13 comprises a bar or link 17 having openings adjacent each end thereof, one wall of each opening being beveled to form a knife edge. A portion of each of the rods 10 and 11 is cut away, thus leaving the flat surfaces 19 which are engaged by the knife edges in each end of the bar 17. The bar is maintained in proper position by means of plates 20 secured to the flat surfaces 19 by means of screws 21. The intermediate portion of the bar 17 is formed with laterally projecting ears 23 having oppositely projecting aligned knife edges which are adapted to engage the flat surfaces of a pair of upwardly extending pins 24, these pins being rigidly secured to a member 25, the latter being adjustably mounted in the bracket 4 by means of the nuts 26. The rods 10 and 11 are also made adjustable relative to the brackets 8 and 9 by means of the nuts 27 so that the check bar 17 may be brought into proper horizontal position.

Erected upon the base housing 1 midway between the platters 12 and 13 is an upright housing 28 within which is supported a chart 29 visible through a glazed window 30. An indicator hand 31 preferably formed of sheet metal is rigidly secured to the lever 3 by means of screws 32 and is adapted to cooperate with the chart 29 in a manner to be hereinafter described.

Threaded upon the rods 10 and 11 are cup-like members 34 and 35 either of which may be used as a loading box for bringing the scale to balance by inserting in a hollow portion thereof a quantity of lead shot 36. When the members 34 and 35 are in the positions illustrated in full lines in Figures I and IV the weighing mechanism is free to operate in the normal way. In order to lock the weighing mechanism of the scale against relative movement it is only necessary to rotate the cup-like members 34 and 35 in a clockwise direction until the lower flanges of these members engage the upper surfaces of the collars 37 and 38. This movement elevates the lever 3 from its normal position and causes the back surfaces of the fulcrum pivots to engage the thrust plates 40 secured to the bracket 4 and the back surfaces of the pivots in the ends of the lever 3 to engage the thrust plates 42. In this manner all of the pivots are relieved of engagement with their respective bearings and the weighing mechanism is securely held against relative movement. In order that the locking mechanism may operate properly each of the cup members 34 and 35 should be rotated through substantially equal distances so that the indicator hand 31 may be locked approximately in central position in the housing 28. When the weighing mechanism is to be placed in weighing condition the cup members 34 and 35 may be rotated in a counter-clockwise direction until the members engage the lower surfaces of the platters 12 and 13.

The load resistant or counterbalancing element comprises a contractile spring 43, one end of which is secured to the lower extremity of the rod 10, the other secured to a transversely extending bar 44 secured to the base 1 in any suitable manner. The oscillations of the weighing mechainsm are dampened by means of a dash pot 46, the plunger of which is pivotally connected to the lower end of the rod 11, the dash pot cylinder being supported upon another transversely extending bar 47 secured to the base 1.

In the operation of the scale, a weight is placed upon the weight receiving platter 13 equal to the weight of the loads to be tested. For example, if it is desired to test two pound prints of butter, a two pound test weight is placed upon the platter 13. The prints of butter are then successively placed upon the load receiving platter 12, the relative difference in weights being indicated upon the chart 29. As clearly shown in Figure I, the chart 29 bears a central mark designated "zero" with which the tip of the indicator hand is adapted to register when the weight of the load upon the commodity receiver is correct, the words "Under" and "Over" being printed upon the chart to indicate whether the weight of the commodity exceeds or is less than the predetermined desired weight.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a frame, a lever fulcrumed upon said frame, platter supports pivotally supported upon each end of the lever, weight and load receiving platters mounted upon said supports, and means carried by said platter supports adjustable relatively thereto and engageable with said frame to lock said lever against relative movements.

2. In a device of the class described, in combination, a base housing, an even arm lever fulcrumed in said base housing, said lever having pivots adjacent each end thereof, platter supports carried by said pivots, said platter supports including threaded members, weight and load receiving platters mounted upon said platter supports, and means carried by said threaded members adapted for engagement with said base housing to restrain relative movement of said lever.

3. In a device of the class described, in combination, a base housing, an even arm lever fulcrumed within said base housing, indicating means operatively connected to said lever, weight and load receiving platters supported upon said lever, a check link located above the lever and connected to said platters and to a fixed member for stabilizing the platters during weighing movements, and means located exteriorly of said base housing and adapted to co-operate with said housing and said platters to lock the lever against relative movement.

4. In a device of the class described, in combination, a frame, weighing mechanism including a lever supported upon said frame, a load counterbalancing element operatively connected to said weighing mechanism, load and weight receiving platters supported upon said weighing mechanism, stabilizing means located above said lever for preventing tilting of said platters, and means adapted to co-operate with said platters and said frame to restrain the weighing mechanism against further movement.

5. In a device of the class described, in combination, a base housing, weighing mechanism including a lever fulcrumed within said base housing, load and weight receiving platters supported upon said lever, means located within said base housing and above said lever for stabilizing said platters throughout weighing movements, and adjustable means adapted to co-operate with said platters and said base housing to restrain relative movements of said weighing mechanism when the scale is being moved from place to place.

CHAS. G. STRUBLER.